United States Patent Office 3,213,116
Patented Oct. 19, 1965

3,213,116
AMINE COMPOUNDS AND METHODS FOR
THEIR PRODUCTION
George W. Moersch and Winifred Ann Neuklis, Ann
Arbor, Mich., assignors to Parke, Davis & Company,
Detroit, Mich., a corporation of Michigan
No Drawing. Filed May 29, 1963, Ser. No. 283,986
4 Claims. (Cl. 260—397.4)

The present invention relates to novel steroid compounds and to methods for their production. More particularly it relates to 2-N,N-dimethylaminomethylene-17α-methyl-5α-androstan-3-one compounds of the formula

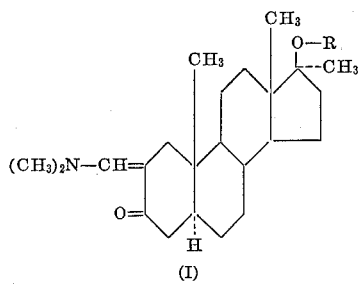

and to acid-addition salts thereof; where R is lower alkanoyl.

In accordance with the invention, 2-N,N-dimethylaminomethylene-17α-methyl - 5α - androstan - 3-one compounds having the above formula are prepared by the reaction of 17α-methyl-5α-androstan-3-one compounds of the formula

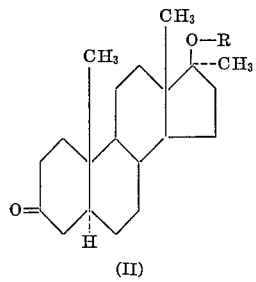

with a reagent prepared by mixing phosphorus oxychloride and N,N-dimethylformamide. In formula II, R has the aforementioned significance. In this reaction, excess N,N-dimethylformamide is normally used as the solvent. Other inert solvents, such as aromatic hydrocarbons, e.g., benzene, toluene, and xylene, and chlorinated alkanes and alkenes, e.g., tetrachloroethane, pentachloroethane, trichloropropane, and trichloroethylene may also be used, however. When a solvent other than N,N-dimethylformamide is use, it is not harmful to employ a small excess of N,N-dimethylformamide in the preparation of the phosphorus oxychloride-N,N-dimethylformamide reagent; an excess of phosphorus oxychloride should be avoided. In the preparation of the phosphorus oxychloride-N,N-dimethylformamide reagent it is desirable to maintain the temperature in the range of 0–5° C. In the further reaction of this reagent with the 17α-methyl-5α-androstan-3-one compounds of Formula II, the temperature should not exceed 30° C.; the preferred range is 20–30° C. The reaction is normally complete in 10–20 minutes at 25° C.

The 17α-methyl-5α-androstan-3-one compounds of Formula II used as starting materials in the foregoing process are prepared by the reaction of 17α-methyl-5α-androstan-17β-ol-3-one with a lower alkanoic acid or a reactive derivative thereof, such as the halide or anhydride.

The compounds of the invention having Formula I form acid-addition salts with strong acids, especially mineral acids, such as hydrochloric and sulfuric acids. These salts readily revert to the free base in neutral or basic aqueous media, and are equivalent to the free base compounds for purposes of the invention.

The compounds of the invention are useful as chemical intermediates and as pharmacological agents. As chemical intermediates they can be converted to 2-formyl-3-chloro-17α-methyl-5α-androst-2-ene compounds by further reaction with the phosphorus oxychloride-N,N-dimethylformamide reagent at a temperature in the range of 45–75° C. As pharmacological agents the compounds of the invention exhibit myotropic activity accompanied by a low degree of androgenicity. They are active upon oral administration.

The invention is illustrated by the following examples:

Example 1

A solution of 5.0 g. of 17α-methyl-17β-acetoxy-5α-androstan-3-one in 50 ml. of N,N-dimethylformamide is added all at once to a reagent prepared from 9 ml. of phosphorus oxychloride and 10 ml. of N,N-dimethylformamide. The mixture is stirred at room temperature for 10 minutes and then poured into a mixture of ice and saturated aqueous sodium bicarbonate. The aqueous mixture is extracted with benzene, and the benzene solution is washed well with water and dried over anhydrous magnesium sulfate. The dried solution is evaporated to dryness under reduced pressure, and the 2-N,N-dimethylaminomethylene-17α-methyl - 17β-acetoxy - 5α-androstan-3-one obtained is crystallized from n-hexane; M.P. 195–196° C.

In the foregoing procedure 5.0 g. of 17α-methyl-17β-propionoxy-5α-androstan-3-one can be substituted for the 17α-methyl-17β-acetoxy-5α-androstan-3-one to prepare 2-N,N-dimethylaminomethylene - 17α-methyl-17β-propionoxy-5α-androstan-3-one.

The 17α-methyl-17β-propionoxy - 5α-androstan - 3-one used above can be prepared as follows: A solution of 2.0 g. of 17α-methyl-5α-androstan-17β-ol-3-one in 50 ml. of propionic anhydride is heated under reflux for 3 hours. The solution is evaporated to near-dryness under reduced pressure, and the residue is triturated twice with warm methanol, evaporated to dryness, and crystallized from methanol.

Example 2

A solution of 1.0 g. of 2-N,N-dimethylaminomethylene-17α-methyl-17β-acetoxy-5α-androstan-3-one in 50 ml. of ether is treated with an excess of dry hydrogen chloride, and the precipitated hydrochloride salt of 2-N,N-dimethylaminomethylene-17α - methyl-17β - acetoxy-5α - androstan-3-one is isolated by filtration, washed with ether and dried.

In a similar manner, when 1.0 g. of 2-N,N-dimethylaminomethylene-17α-methyl - 17β-propionoxy-5α - androstan-3-one is treated with an excess of dry hydrogen chloride, there is obtained the hydrochloride salt of 2-N,N-dimethylaminomethylene - 17α - methyl-17β-propionoxy-5α-androstan-3-one.

The free base, 2-N,N-dimethylaminomethylene - 17α-methyl-17β-acetoxy-5α-androstan-3-one, is obtained from the hydrochloride salt by dissolving the salt in water, isolating the precipitated solid by filtration, and drying under reduced pressure.

We claim:
1. 2-N,N-dimethylaminomethylene - 17α - methyl-5α-androstan-3-one compounds of the formula

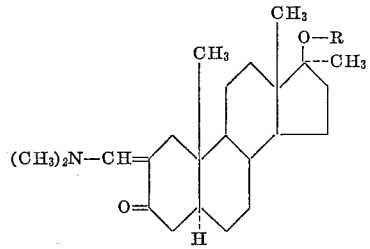

where R is lower alkanoyl.

2. 2-N,N-dimethylaminomethylene - 17α - methyl-17β-acetoxy-5α-androstan-3-one.

3. Process for the production of 2-N,N-dimethylaminomethylene-17α-methyl-5α-androstan-3-one compounds of the formula

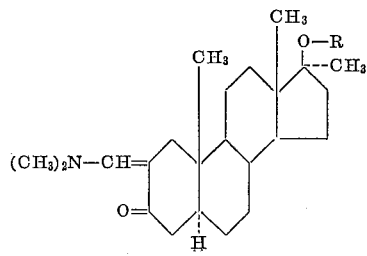

which comprises the reaction of 17α-methyl-5α-androstan-3-one compounds of the formula

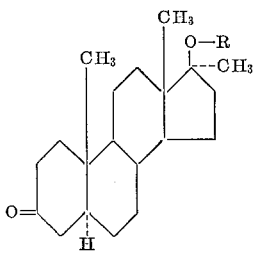

with a phosphorus oxychloride-N,N-dimethylformamide reagent at a temperature in the range of 20–30° C.; where R is lower alkanoyl.

4. Process for the production of 2-N,N-dimethylaminomethylene-17α-methyl - 17β-acetoxy-5α - androstan-3-one which comprises the reaction of 17α-methyl-17β-acetoxy-5α-androstan-3-one with a phosphorus oxychloride-N,N-dimethylformamide reagent at a temperature in the range of 20–30° C.

References Cited by the Examiner

Clinton et al.: "Journ. Org. Chem." (1962), vol. 4, pages 1148–50.

Zderic et al.: "Journ. Med. Chem." March 1963, pages 195–198.

LEWIS GOTTS, *Primary Examiner.*